Patented Apr. 25, 1933

1,906,200

UNITED STATES PATENT OFFICE

BAPTIST REUTER, OF KRAILLING-PLANEGG, GERMANY

4-BROM-DIETHYLACETYLAMINO-1-PHENYL-2,3-DIMETHYL-5-PYRAZOLONE AND THE PROCESS OF PREPARING THE SAME

No Drawing. Application filed March 27, 1931, Serial No. 525,861, and in Germany June 27, 1928.

I have found, that the 4-amido-1-phenyl-2,3-dimethyl-5-pyrazolone can be transformed in the hitherto unknown compound 4-bromdiethylacetylamido-1-phenyl-2,3 dimethyl-5-pyrazolone

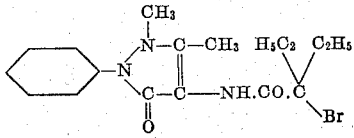

by the action of bromdiethylacetylhalogenides $Br.C(C_2H_5)CO$ hal. (where hal. is Cl.Br.I) on 4-amido-1-phenyl-2,3-dimethyl-5-pyrazolone

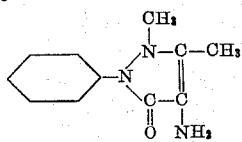

The reaction takes place in the following manner:

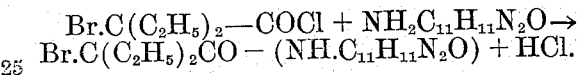

The new compound forms white crystals and is of great therapeutical effect.

In the German Patents 227,013 and 357,752 is described the action of chloracetylchloride and bromisovalerylbromide on 4-amido-1-phenyl-2,3-dimethyl-5-pyrazolone. But it is not possible to make use of the methods described in those patents, while acting bromdiethylacetylhalogenides on 4-amido-1-phenyl-2,3-dimethyl-5-pyrazolone, because the result would be bad yields and impurity in the end product, which cannot be removed from it, forming compounds with a different melting point. On the contrary I have found, that the pure compound of condensation is obtained in yields of 97% of theoretical by combining bromdiethylacetylchloride (or bromide) with 4-amido-1-phenyl-2,3-dimethyl-5-pyrazolone in a solution of benzol or other inert solvent. For neutralizing the liberated HCl in statu nascendi 2 molecules of the aminoproduct were used, one forming the hydrochloric salt of this product in crystallized shape, the second forming the new compound. After distilling off the main amount of the solvent, water is added while agitating rapidly.

After cooling down, the new compound is separated in crystals. It can be filtered off, dried and recrystallized.

From the aqueous mother liquor the hydrochloric 4-amino-1-phenyl-2,3-dimethyl-5-pyrazolone is recovered in white crystals and in quantitative amount by evaporation. The new product shows good therapeutical effects. It lowers the temperature. It reduces the fever. It splits off bromine in the body of animals in an organic form.

Examples (1) 20 gr. of 4-amido-1-phenyl-2,3-dimethyl-5-pyrazolone are dissolved in about 400 cc. benzol. To this solution is added, while stirring 10,5 gr. bromdiethylacetylchloride.

A precipitate separates right away. After all the chloride has been run in, the mixture is heated on the steam-bath for two hours, whereby the precipitate is rendered slightly powdery. After distilling off the benzol from the residue on the steam bath 100 cc. of water are added to the refrigerated mass, while stirring. After stirring for about two hours the hydrochloride 4-amino-1-phenyl-2,3-dimethyl-5-pyrazolone goes in solution, whereas the new compound 4-bromdiethylacetylamino - 1 - phenyl-2,3-dimethyl-5-pyrazolone is separated in crystals. From the evaporated water-mother-liquor one obtains the hydrochloric 4-amino-1-phenyl-2,3-dimethyl-5-pyrazolone in very pure form in just theoretical yield.

Recrystallized from alcohol, benzol, etc. the new compound is obtained in white crystals with the melting point 130°. It is soluble in alcohol, ether, benzol and hydrochloric acid of 20%, hardly soluble in water.

(2) Variation of the manufacturing described in Example 1 consisting in: Filtering the benzol slurry after boiling the amino compound with the bromdiethylacetylhalogenide, thus separating the hydrochloric 4-amino-1-phenyl-2,3-dimethyl-5-pyrazolone and working ahead as described above.

(3) Instead of benzol other solvents may be used.

(4) Instead of bromdiethylacetylchloride other halogenides of bromdiethylaceticacid may be used, as bromide or iodide.

Having now described my invention, what I claim is:

1. A new chemical product consisting of the 4-bromdiethylacetylamino-1-phenyl-2,3-dimethyl-5-pyrazolone being a white crystalline product insoluble in water, soluble in alcohol, ether, benzol, etc. with the formula

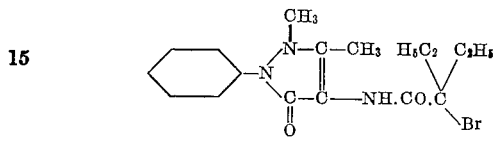

2. The process of making 4-bromdiethylacetylamino-1-phenyl-2,3-dimethyl-5-pyrazolone consisting in acting with one mol. bromdiethylacetylhalogenides upon a solution of 2 mol. 4-amino-1-phenyl-2,3-dimethyl-5-pyrazolone in inert solvents.

3. The process of making 4-bromdiethylacetylamino-1-phenyl-2,3-dimethyl-5-pyrazolone consisting in acting with one mol. bromdiethylacetylchloride upon two mol. of 4-amino-1-phenyl-2,3-dimethyl-5-pyrazolone in inert solvents.

In testimony whereof I affix my signature.

BAPTIST REUTER.